Sept. 20, 1966      R. W. HOWE      3,273,375

FLOW METER CALIBRATING BARREL

Filed Nov. 24, 1964

INVENTOR,
RALPH W. HOWE

BY *Head & Johnson*

ATTORNEYS

United States Patent Office 3,273,375
Patented Sept. 20, 1966

3,273,375
FLOW METER CALIBRATING BARREL
Ralph W. Howe, Tulsa, Okla., assignor to Halmor Industries, Inc., Tulsa, Okla., a corporation of Oklahoma
Filed Nov. 24, 1964, Ser. No. 413,422
6 Claims. (Cl. 73—3)

This invention relates to a calibrating barrel. More particularly, the invention relates to an apparatus for calibrating a flow meter. Still more particularly, the invention relates to an improved calibrating barrel for use in an apparatus to calibrate flow meters, the invention being characterized by increased accuracy, economy of construction and dependability.

The use of calibrating barrels in apparatus for calibrating flow meters shown in United States Patents Numbers 2,772,561 and 3,021,703. These patents disclose a method for calibrating flow meters which has found acceptance in the oil industry. The method includes the movement of a piston through a predetermined length of barrel, the barrel being either straight or U-shaped. The piston actuates detector switches to start and stop a meter actuated electric pulse count. The movement of the piston between such predetermined positions displaces a constant volume which is checked against the meter count.

Several problems have existed with the type of calibrating barrels used in such calibrating systems as disclosed in the above two mentioned patents. In order for the device to function accurately, there must obviously be a close fit between the external surface of the piston, which usually is in the form of a sphere, and the inside tubular surface of the calibrating barrel. To prevent leakage between the piston and the barrel, the inside of the barrel must have a highly machined finish. At the same time it is frequently required that the system test flow through meters at fairly high pressure rates. This means that the cylinder must be capable of withstanding high pressures. The difficulty of providing a barrel which has a smooth internal finish and at the same time is capable of withstanding high pressure is easily appreciated. Another difficulty with existing systems is that, as the pressure of the fluid changes, expansion of the calibrating cylinder takes place which changes the volume swept by the piston as it moves between the two detector switches.

Another problem with present calibrating barrels which affects the accuracy of the calibrating method is that variations in the volume swept by the piston moving in the barrel are due to expansion and contraction of the cylinder caused by temperature change. The temperature of the barrel is affected by both the fluid temperature flowing through the barrel and the external ambient temperature.

A fourth difficulty in present calibrating barrels is that stresses on the barrels preclude the use of many materials which would otherwise be ideal for high accuracy measurements, such materials being glass and the like.

It is therefore an object of this invention to provide an improved calibrating barrel for use in meter provers. More particularly, it is an object of this invention to provide an improved meter prover system including particularly an improved calibrating barrel. A more specific object of this invention is to provide an improved calibrating barrel for use in a meter prover system, the barrel being characterized by a double case arranged in such manner that fluid flows both externally and internally of the calibrating barrel.

These and other objects will be satisfied and a better understanding of the invention will be had by referring to the following description and claims taken in conjunction with the attached drawings in which:

This invention may be described as an improved calibrating barrel for a meter prover system. More particularly, but not by way of limitation, the invention may be described as a calibrating barrel comprising an outer tubular housing closed at each end, a reduced diameter and length inner tubular barrel supported within the housing providing an annulus between the exterior of the barrel and the interior of the housing, a wall partitioning the annulus into two longitudinal portions, the housing having fluid ports therein communicating with each annulus portion wherein fluid flowing into one port flows within one annulus portion through the barrel, through the other annulus portion and out of the other port, a free piston in the barrel and first and second spaced apart detector switches actuatable by the passage of the piston as it moves in the barrel.

Figure 1:
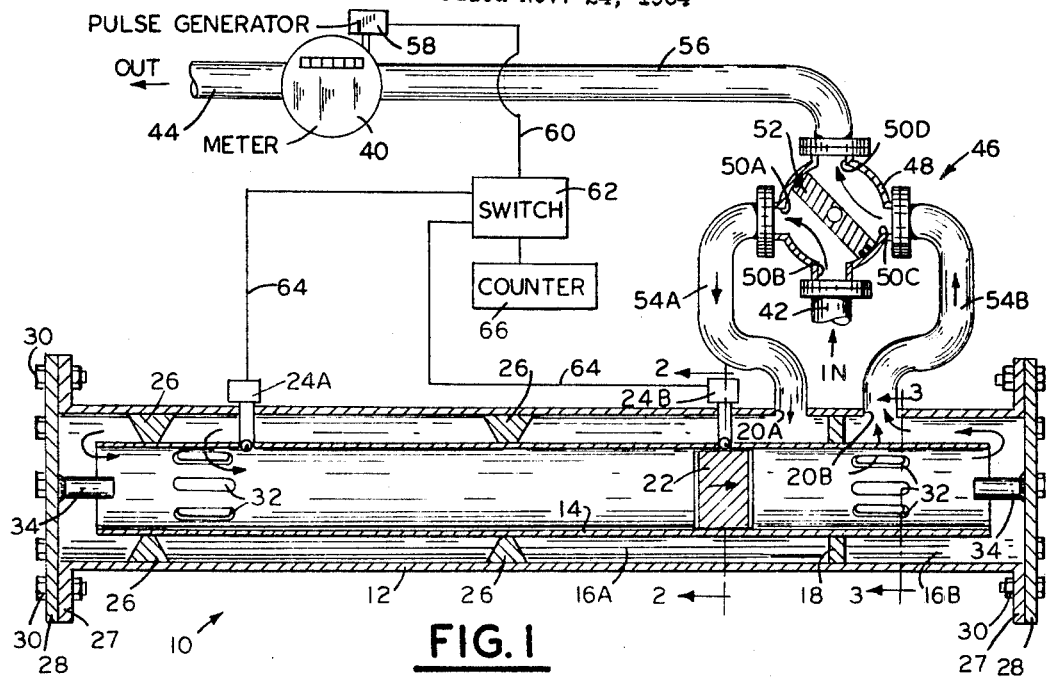
FIGURE 1 is a schematic view illustrating the meter prover apparatus of this invention with the calibrating barrel shown in cross-section.

Referring now to the drawings and first to FIGURE 1, the improved calibrating barrel of this invention is indicated generally by the numeral 10. The calibrating barrel consists essentially of the following basic elements:

(a) An outer tubular housing 12;

(b) A reduced diameter and length inner tubular barrel 14 supported within the housing and providing annulus 16A and 16B between the exterior of the barrel 14 and the interior of the housing 12;

(c) A wall 18 partitioning the annulus into two longitudinal portions 16A and 16B, the housing having fluid port 20A therein communicating with annulus portion 16A and fluid port 20B therein communicating with annulus portion 16B;

(d) A free piston 22 in the inner barrel 14; and (e) First and second spaced apart detector switches 24A and 24B actuatable by the passage of the piston 22 as it moves in the barrel 14.

Detector switches 24A and 24B may be of the proximity type such as shown in United States Patent Number 3,120,118, or of the mechanically actuated type such as shown in copending patent application Number 330,434, filed December 13, 1963, for a "Piston Detector Switch." The outer housing 12 is preferably, but not necessarily, tubular. The barrel 14 is supported preferably coaxially within housing 12 and held in position by spaced ribs 26. The housing 12 is closed at both ends, such as by means of plates 28 held in position by bolts and nuts 30.

Figure 2:
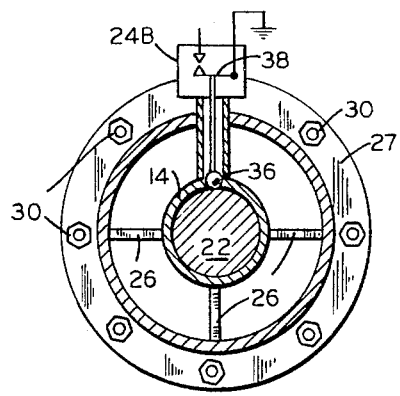
FIGURE 2 is a cross-sectional view taken along the line 2—2 of FIGURE 1.
Figure 3:
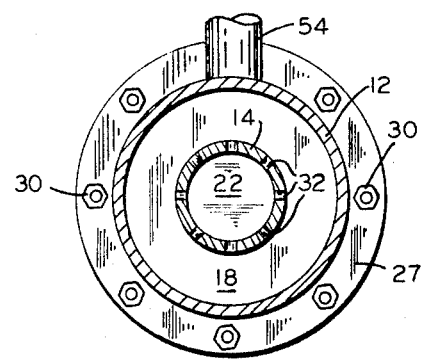
FIGURE 3 is a cross-sectional view taken along the line 3—3 of FIGURE 1.

Adjacent each end of the barrel 14 are outlet ports 32 (see FIGURES 1 and 3). The outlet ports 32 are spaced toward each end from each of the detector switches 24A and 24B. Stops 34 are provided to prevent the piston 22 from passing out the end of barrel 14. Stops 34 are preferably, as shown, affixed to plates 28. This permits fluid flow easily out the end of the barrel 14 as piston 22 moves toward the end of the barrel but nevertheless prohibits the piston from leaving the confines of the barrel. The piston detector switches 24A and 24B may, as previously indicated, include either proximity or physical actuating switches. As shown, schematically, in FIGURE 2, the physically actuating switch may include a ball 36 which is displaced upward by the passage of piston 22 therethrough, the upward displacement serving to actuate switch 38.

Referring again to FIGURE 1, the complete meter calibrating system is shown connected to a meter 40 which is to be calibrated. Inlet piping 42, by which fluid flows into the system, outlet piping 44 by which fluid flows out of the system, and a flow direction valve switching system, indicated generally by the numeral 46, provide means of conducting fluid through the complete calibrating system. The flow switching system 46 may be a series of separate valves manifolded together or, preferably, as illustrated in FIGURE 1, a valve such as described in copending application 252,501, filed January 18, 1963, and entitled "Multi-Port Valve." Such a flow switching system consists essentially of a cylindrical housing 48 having four fluid ports 50A, 50B, 50C and 50D therein. A closure member 52 is pivotally supported in the housing. By rotating the closure member 52 through ninety degrees, the direction of fluid flow in the valve is changed in a manner to be described subsequently. Piping 54A connects port 50A of the flow directing system 46 with port 20A in housing 12 and piping 54B connects port 50C of flow directing system 46 with port 20B of housing 12. Pipe 56 conducts fluid out of flow directing system 46 through meter 40.

Affixed to meter 40 is an electric pulse generator 58 which generates electrical pulses in proportion to the quantity of fluid passing through the meter 40. An example of a pulse generator 58 may be found in copending application Number 346,810, filed February 24, 1964, and entitled "Meter Pulsator." The electrical pulse output of pulse generator 58 is fed by conductors 60 through an electronic switch 62 which is controlled by the detector switches 24A and 24B through conductor 64. The output of the electronic switch 62 is fed to an electronic pulse counter 66.

*Operation*

When meter 40 is to be calibrated, fluid is fed into the system through inlet pipe 42. With the closure member 52 of the flow directing system 46 positioned as shown in FIGURE 1, the fluid flows from inlet piping 42 through port 50B into the flow directing system 46, out through port 50A and piping 54A, through port 20A and into housing 12. The fluid then flows in the annulus portion 16A and freely through the ports 32 and the opened left end of the barrel 14. The fluid flow continues through the interior of barrel 14 moving piston 22 at the exact rate of fluid flow through the barrel. Piston 22 first actuates, as it moves from the left to the right end of the barrel 14, detector switch 24A, which in turn actuates electronic switch 42 and feeds the electrical pulse output of pulse generator 58 to counter 66. As fluid flow continues, the piston 22 moves to the right until passing detector switch 24B which, by means of electronic switch 62, cuts off electrical pulses to counter 66.

As fluid flow continues, piston 22 moves on past ports 32 and is stopped by the member 34 at the right end of the barrel 14.

Since the area displaced by the piston 22 moving within the barrel 14 between detector switches 24A and 24B is exactly the same each time, the meter 40, if it is in accurate calibration, will register exactly the same total electrical pulse count on counter 66. Any inaccuracy in the meter is indicated by disparity from the norm of the electric pulse count on counter 66 and the meter is thereby calibrated.

Figure 4:
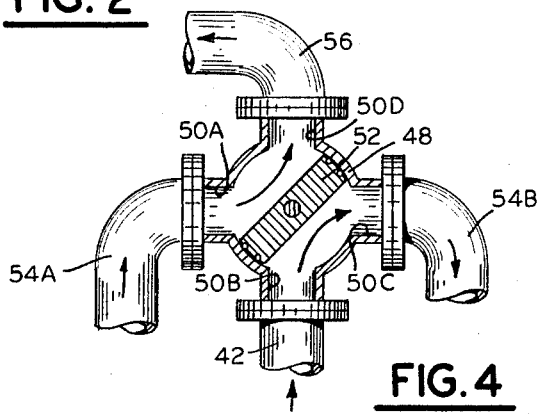
FIGURE 4 is a schematic view of the valving system portion of the system of FIGURE 1 showing the valve moved to an alternate position to cause reverse fluid flow through the calibrating barrel.

After piston 22 reaches one end, the fluid flow can continue through the calibrating barrel 10 indefinitely. When the next calibrating sequence is required, the closure member 52 of fluid directing system 46 is rotated 90 degrees to the position shown in FIGURE 4. In this position, fluid flowing from inlet pipe 42 passes out through port 50C and into the interior of outer housing 12 through port 20B. This causes fluid flow into ports 32 adjacent the right end of the barrel 14. The reverse fluid flow causes pressure against the piston 22 which moves it within the barrel towards the left. As it moves towards the left, piston 22 first encounters detector switch 24B which, by means of electronic switch 62, again starts the counter 66 totaling the output of pulse generator 58. When the piston 22 reaches detector switch 24A, the pulse count is stopped. Piston 22 continues to travel until it is stopped by member 34 at the left end of housing 12.

Although not limited to such an arrangement, the preferred placement of ports 20A and 20B are adjacent to each other and to either side of the divider wall 18 as shown in FIGURE 1. This placement causes fluid flow substantially completely along the external length of barrel 14 which exposes both the internal and external surface of the barrel 14 to the temperature of the fluid being tested. Such an arrangement substantially precludes the creation of differential temperatures across the barrel 14, an important factor in that it permits the use of materials for the construction of barrel 14 which are not tolerable to widely divergent temperature gradients. A material ideally adaptable for a calibrating barrel 14 is glass. The temperature throughout the length of the barrel 14 will be that of the liquid flowing through the system, thus high temperature gradient differences are not created. This permits the use of glass, and similar materials, in the construction of barrel 14.

The calibrating barrel and system of this invention have many advantages over the existing types of single wall barrels, among which are the following:

(1) Error caused by expansion of the barrel 14 due to internal pressure is eliminated as the same pressure exists both internally and externally of the barrel. Thus, regardless of the change of the total system fluid pressure, such change does not affect the accuracy of the meter measuring system of this invention. While the outer housing 12 may expand by varying amounts due to different system pressures, such expansion does not affect the calibrating barrel 14.

(2) Since the calibrating barrel 14 is not required to withstand the fluid pressure of the system, a wide variety of materials may be economically utilized for the barrel which cannot be utilized with the present single wall calibrating barrels. With the system of this invention the calibrating barrel 14 may be constructed of glass, stainless steel, ceramic coated metals, and so forth.

(3) The use of such more adaptable materials means that a smoother and more accurately formed inner surface may be provided for barrel 14 so that a more accurately fitting piston 22 may be utilized. In addition, since barrel 14 will not be subject to pressure or expansion, the piston 22 can be more accurately fitted to it for greater overall system accuracy.

(4) Since the barrel 14 is completely surrounded by the fluid of the system, the barrel will assume the temperature of the fluid and variations of the dimensions caused by such temperature changes can be accurately calculated and temperature compensation easily correlated with the meter being tested. This is in contrast with the problem encountered in the present type of single wall calibrating barrels wherein the interior is subject to the fluid temperature while the exterior is subject to ambient temperature. In the system of this invention, the barrel 14 has no external to internal temperature gradient.

Although this invention has been described with a certain degree of particularity, it is manifest that many changes may be made in the details of construction and the arrangement of components without departing from the spirit and scope of this disclosure.

What is claimed:
1. A calibrating barrel comprising:
   an outer tubular housing closed at each end;

a reduced diameter and length inner tubular barrel supported within the housing providing an annulus between the exterior of the barrel and the interior of the housing;

a wall partitioning the annulus into two longitudinal portions, the housing having fluid ports therein communicating with each annulus portion wherein fluid flowing into one port flows within one annulus portion, through the barrel, through the other annulus portion and out the other port;

a free piston in the barrel; and first and second spaced apart detector switches actuatable by the passage of the piston as it moves in the barrel.

2. A calibrating barrel according to claim 1 wherein the barrel is open at each end and has at least one port opening therein adjacent each end and including means of preventing the piston from passing out each end of the barrel.

3. A meter prover comprising:

a flow switching means having a fluid inlet port, a fluid outlet port, calibrating fluid ports and a pivoted fluid flow diverter for directing fluid flow optionally out through one or the other of the fluid flow ports;

an outer tubular housing closed at each end;

a reduced diameter and length inner tubular barrel supported within the tubular housing providing an annulus therebetween;

a wall partitioning the annulus into two longitudinal portions, the housing having a first fluid port therein communicating the annulus to one side of said wall with one of said valve assembly calibrating fluid ports and a second fluid port therein communicating the annulus to the other side of said wall with the other of said valve assembly calibrating fluid ports whereby fluid flowing into said valve assembly fluid inlet ports flows through one of said calibrating fluid ports, into said annulus to one side of said wall, through said barrel into the annulus to the other side of said wall and out said tubular housing through one of said fluid ports, through the second of said valve assembly calibrating ports and out said valve assembly fluid outlet ports when said fluid flow diverter is in one position and wherein fluid flows through the barrel in the opposite direction when the fluid flow diverter is in the opposite position;

a free piston in the inner tubular barrel; and first and second spaced apart detector switches actuatable by the passage of said piston as it moves in said barrel.

4. An apparatus for calibrating an indicating flow meter in a pipeline comprising:

a pulse generator affixed to the flow meter to generate electrical pulses in proportion to the quantity of fluid flow therethrough;

an outer longitudinal housing closed at each end;

a reduced diameter and length inner tubular barrel supported within the housing providing an annulus between the exterior of the barrel and the interior of the housing;

a wall partitioning the anulus into two longitudinal portions, the housing having a first fluid port therein communicating with one annulus portion and a second fluid port therein communicating with the other annulus portion wherein fluid flowing into one port flows within one annulus portion, through the barrel, through the other annulus portion and out the other port, one of the ports communicating with the flow meter;

a free piston in the barrel adaptable to be propelled within said barrel by fluid flow at the velocity thereof;

first and second signal means mounted in longitudinally spaced relationship in said barrel, said signal means being adapted to be actuated by arrival of said piston thereat;

electric pulse counting means; and electric switch means connecting said first and second signal means with said pulse generator and said electric pulse counting means whereby the count of the electric pulse output of said pulse generator by the counting means is initiated upon the arrival of said piston at said first signal means and terminated by the arrival of said piston at said second signal means.

5. An apparatus according to claim 4 wherein said barrel is open at each end and has at least one port opening therein adjacent each end and including means of preventing said piston from passing out each end of the barrel.

6. An apparatus according to claim 4 including a flow switching means, said means having a fluid inlet port, a fluid outlet port, first and second calibrating fluid ports, and a pivoted fluid flow diverter, the first fluid calibrating port connected to said first port in said housing and the second fluid port connected to the said second port in said housing.

References Cited by the Examiner

UNITED STATES PATENTS

| 1,929,719 | 10/1933 | Werder. | |
|---|---|---|---|
| 2,792,705 | 5/1957 | Barrett | 73—3 |
| 3,120,118 | 2/1964 | Boyle | 73—3 |

LOUIS R. PRINCE, *Primary Examiner.*